Oct. 15, 1929.  H. MARSHALL  1,732,132
SAW SHARPENING MACHINE
Filed Jan. 9, 1928  4 Sheets-Sheet 1
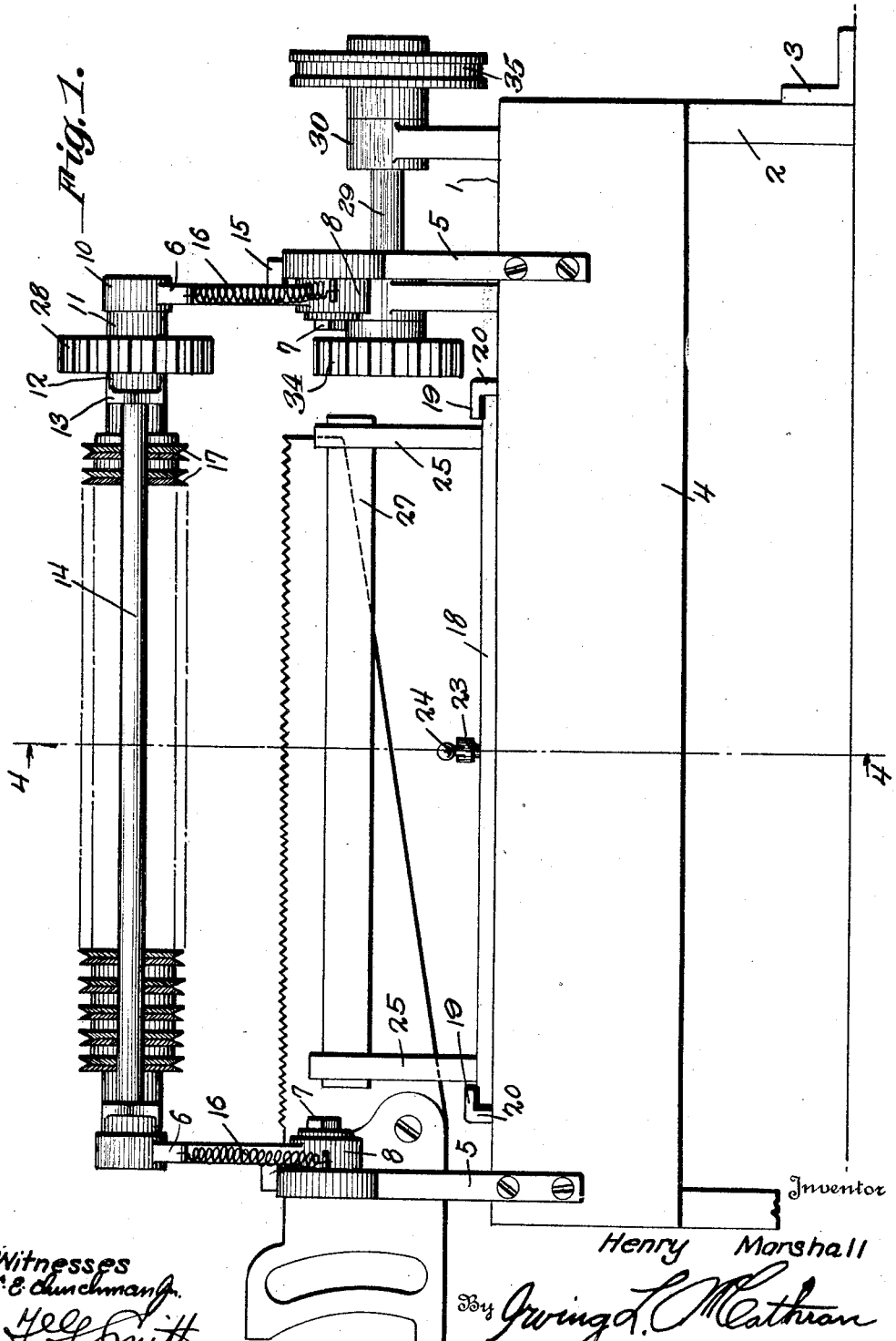
Inventor
Henry Marshall
By Irving L. Cathran
Attorney
Witnesses
C. E. Dunchman Jr.
H. L. Smith

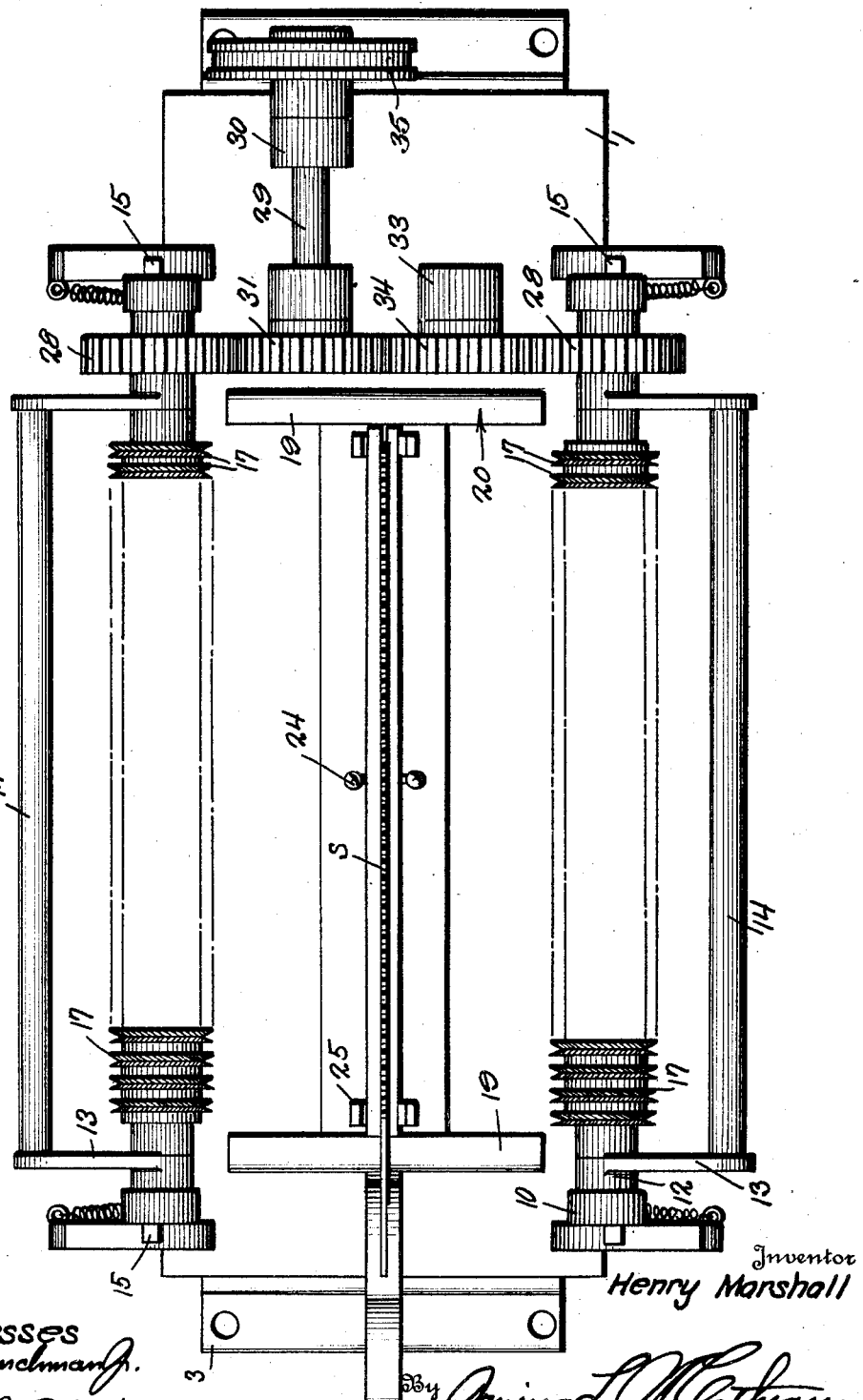

Oct. 15, 1929.    H. MARSHALL    1,732,132
SAW SHARPENING MACHINE
Filed Jan. 9, 1928    4 Sheets-Sheet 3
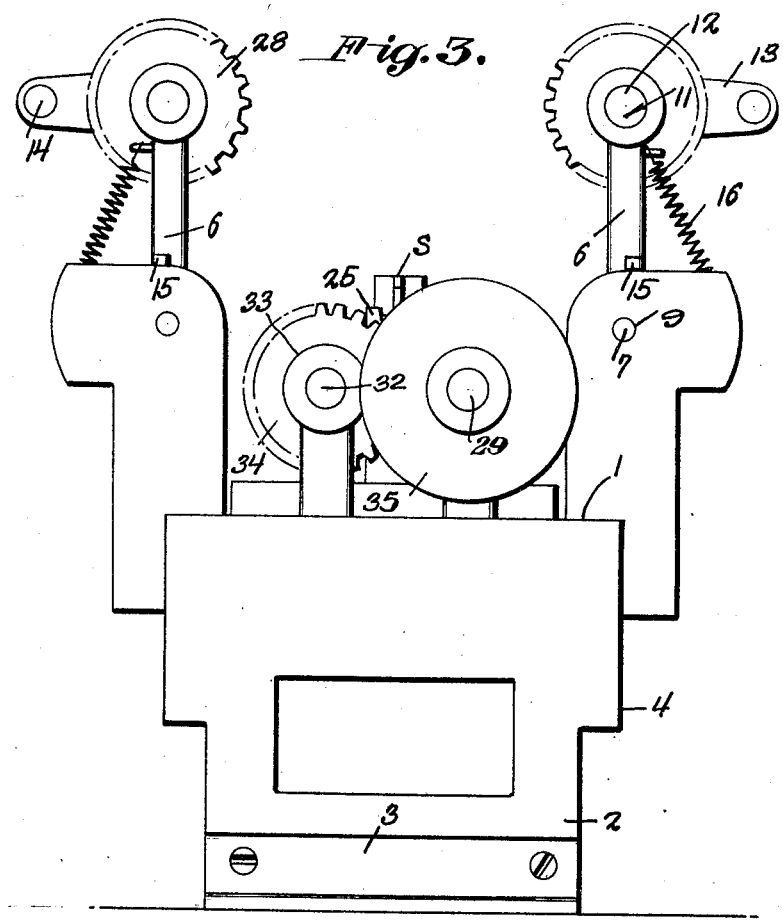
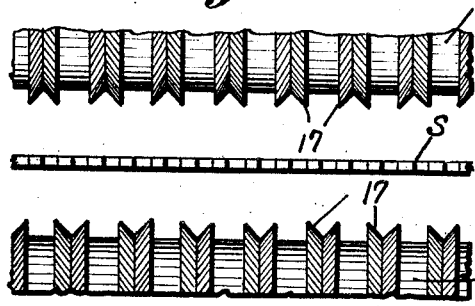
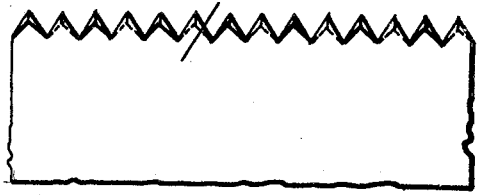
Henry Marshall, Inventor

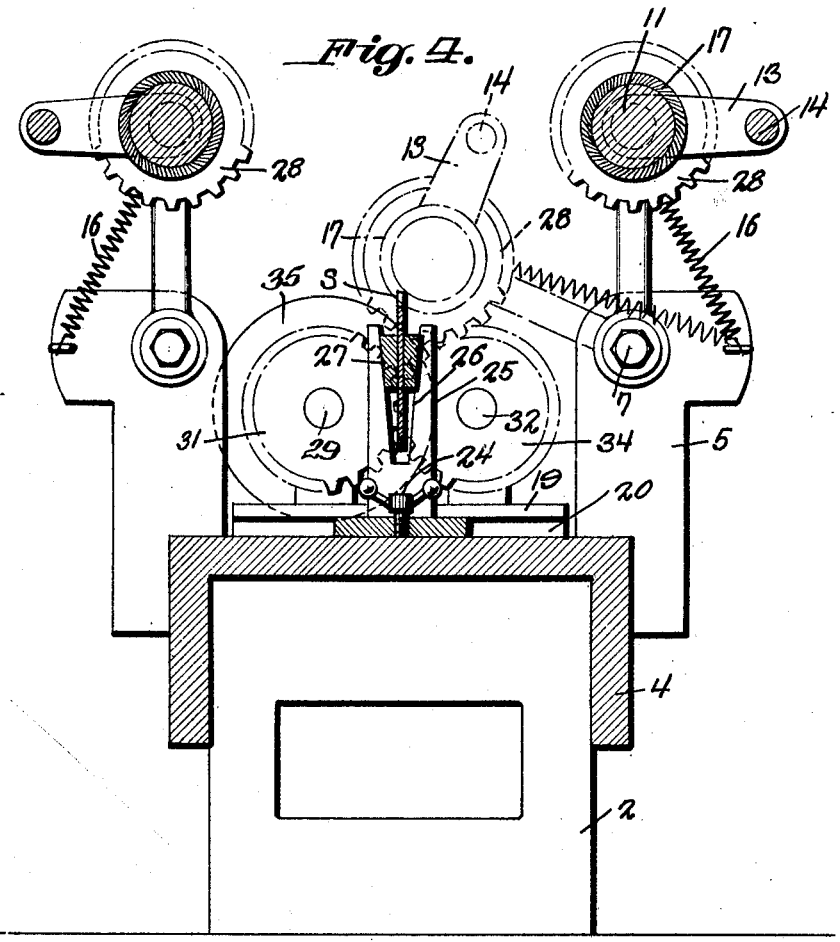
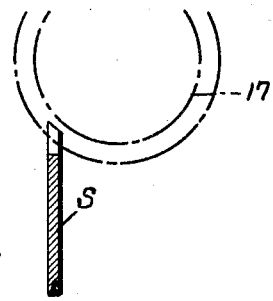
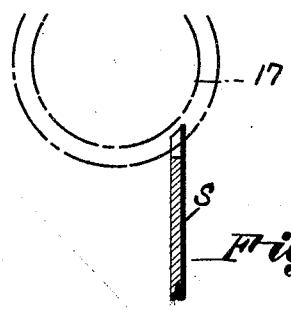

Patented Oct. 15, 1929

1,732,132

UNITED STATES PATENT OFFICE

HENRY MARSHALL, OF CLEVELAND, OHIO

SAW-SHARPENING MACHINE

Application filed January 9, 1928. Serial No. 245,571.

This invention relates to machines for sharpening saws and has as its general object to provide a machine highly efficient in its operation and capable of use in sharpening all sizes and types of hand saws.

It is well known that in sharpening saws, and particularly those of the hand type which are designed for use in sawing wood, it is customary to bevel the edges of the opposite faces of alternately opposite teeth of the saw blade, so that the edges of one side of each tooth will be beveled from the base of the tooth to the end thereof, and the edges of the opposite faces of the next adjacent teeth will be similarly beveled, and heretofore this has been accomplished by hand filing the teeth, with the result that, even with the exercise of extreme care, the teeth were unevenly sharpened. Therefore another object of the invention is to provide a machine for sharpening saws, by the use of which machine the teeth of hand saws may be rapidly sharpened and in a uniform manner.

Another object of the invention is to provide a saw sharpening machine so constructed that, in the operation thereof, the saw teeth will be uniformly sharpened, thus enhancing the efficiency of the saw after it has been acted upon by the machine and the teeth thereof have been set.

While the accompanying drawings and the description which is to follow, constitute a disclosure of the preferred embodiment of the invention, it will be understood that various changes may be made within the scope of what is claimed.

In the accompanying drawings:

Figure 1 is a view in front elevation of the machine embodying the invention, the view illustrating a saw mounted in position within the machine to be acted upon by the sharpening or abrading units of the machine;

Figure 2 is a top plan view of the machine;

Figure 3 is a view in end elevation of the machine;

Figure 4 is a vertical transverse sectional view through the machine taken substantially on the line 4—4 of Figure 1 looking in the direction indicated by the arrows;

Figure 5 is a fragmentary view in top plan illustrating portions of the two abrading units of the machine and a portion of the saw blade to be acted upon thereby, the view illustrating schematically the arrangement of the abrading elements with respect to the saw to be sharpened;

Figure 6 is a view in side elevation and of a fragmentary nature, illustrating the manner in which the teeth of the saw are sharpened by the teeth of the machine;

Figure 7 is a schematic view illustrating the manner in which one of the abrading units of the machine is to act upon the teeth of the saw to be sharpened;

Figure 8 is a similar view illustrating the manner in which the other unit is to act upon the teeth of the saw to be sharpened.

The machine embodying the invention includes a base 1 which is preferably mounted upon end supports 2 provided at their lower outer sides with attaching brackets 3 which may be of angle iron construction or of any other desired construction adapting the said end members 2 to be securely and firmly anchored to the surface of the top of a work table or bench, or upon any other fixed support. If desired the end members 2 of the base may be braced by side members 4 which extend therebetween and which are secured thereto by screws or other suitable fastening elements, these side members 4 being located below and extending longitudinally of the opposite longitudinal edges of the base 1.

Generally speaking the machine, embodying the invention, includes two abrading units which are supported normally out of position to act upon the saw blade to be sharpened and which are selectively movable into active relation to the toothed edge of the blade and driven from a common prime mover, and each of these units includes, in its construction, a pair of upright bearing brackets 5 rigidly mounted near the ends of the base 1, and arms 6 which are separably pivotally connected with the brackets 5 through the medium of stud bolts 7 which are fitted through collars 8 formed at the inner ends of the arms 6 and threaded into openings 9 formed in the respective bearing brackets 5. Each arm 6 is provided at its outer end with a bearing collar 10 preferably integral therewith, and each unit further embodies a cylindrical shaft 11 which has reduced ends 12 fitted in the openings of the bearing collars 10, the shaft being in this manner rotatably supported at the outer ends of the arms 6. The collars 10 include reduced lateral extensions 12 from which extend arms 13 which are connected by a handle bar 14 extending between their outer ends, it being evident at this point that by grasping the bar 14 of either unit, the arms 6 may be swung about the pivots 7 so as to correspondingly adjust the shaft 11. By reference to Figure 3, it will be observed that an abutment lug 15 is provided upon the outer side of each arm 6 in spaced relation to the pivot 7 therefor, and, when the arms 6 are in upright position as shown in Figure 3, these abutment lugs will engage against the upper ends of the respective bearing brackets 5 so as to limit the swinging movement of the arms 6 in a direction away from the longitudinal axis of the base of the machine. In order that the arms 6 may be held in the position stated, springs 16 are connected to the arms near the outer ends thereof and to the outer portions of the upper ends of the bearing brackets 5 as best shown in Figure 3 of the drawings, and it will be understood, at this point, that by grasping the handle bar 14 of either unit and exerting pressure thereagainst in an inward direction, the arms 6, together with the shaft 11 supported thereby, will be swung inwardly. Each of the shafts 11 is provided with a series of circumscribing abrading flanges 17 which are arranged in equi-distantly spaced relation, and by reference to Figures 1, 2 and 5 of the drawings, it will be observed that the periphery of each of these flanges is of V shape or in other words the peripheries of the flanges are circumferentially grooved, and the opposite walls of the grooves are serrated or otherwise roughened so as to provide abrading surfaces. It will also be observed by reference to Figures 2 and 5 of the drawings, that the abrading flanges of one shaft are arranged in staggered relation to the abrading flanges of the other shaft, and consequently, when the shafts are rotated with the abrading flanges in contact with the opposite sides of the cutting edge of the saw blade, the flanges of one shaft at a time acting upon the said cutting edge of the blade, alternate ones of the teeth of the cutting edge will be beveled and sharpened as illustrated in Figure 6, the opposite sides of the remaining teeth being beveled and sharpened by the action of the flanges of the other shaft thereagainst.

In order that a saw blade may be supported between the abrading units in position to be selectively acted upon by said units, means is provided which will now be described. The said means comprises a base plate 18 which is preferably of oblong rectangular form and which has its ends disposed beneath the overhanging flanges 19 of anchoring members 20 which are secured in spaced parallel relation to each other to the upper side of the base 1 of the machine, a clamping screw 23 being fitted adjustably through a threaded opening located midway between the ends of the plate 18 and being provided with handle members 24 whereby it may be rotatably adjusted so as to bind against the upper side of the base 1 and thus anchor the plate 18 in its centered position between the abrading units. An upright 25 is rigidly mounted near each end of the base plate 18 and each upright is formed with a vertically extending kerf 26, the opposite side walls of which are tapered or inclined toward each other in a downward direction and are adapted to receive between them the ends of blade clamping bars 27 which bars may be of wood and are of greater thickness at their upper edges than at their lower edges and have their relatively remote sides inclined downwardly so that when the clamping members are disposed at the opposite sides of a saw blade indicated by the reference letter S, and the blade and clamping members are arranged within the kerfs 26 of the standards 25 and shoved downwardly, the outer inclined sides of the clamping members 27, riding against the inclined walls of the kerfs 26, will effect clamping of the saw blade, near its toothed edge, between said clamping members 27, the blade being in this manner firmly supported in an upright position midway between and parallel with respect to the shafts 11 of the two abrading units. It will now be evident that, by grasping the handle bar 14 of either abrading unit, the shaft 11 thereof may be swung into position such that the abrading flanges 17 will be in abrading contact with the adjacent sides of alternate teeth of the saw, when rotary motion is imparted to the shaft 11. It will likewise be evident at this point, and particularly by reference to Figures 5, 6, 7 and 8 of the drawings, that when, in the operation of the machine, the abrading units are alternately brought into active relation to the toothed cutting edge of the saw blade, alternate teeth will be sharpened and beveled at each cycle of operation, so that after both of the abrading units have been brought into operation, all of the teeth of the saw blade will be uniformly beveled.

In order that rotary motion may be imparted to the shaft 11 of each abrading unit, at the time the flanges 17 upon the shaft are brought into engagement with the saw teeth, a gear 28 is fixed upon each shaft 11, and a power shaft 29 is mounted in suitable bearings 30 upon the base 1 and has fixed upon one of its ends the gear 31 so positioned that the gear 28 of one of the abrading units may be brought into mesh therewith. A stub shaft 32 is mounted in a suitable bearing 33 upon the said base 1, and a gear 34, of the same diameter as the gear 31, is fixed upon said shaft and meshes with the gear 31, and, as will be observed by reference to Figure 4, this gear 34 occupies a position such that the gear 28 of the other abrading unit may be brought into mesh therewith when the unit is swung downwardly into operative relation to the toothed edge of the saw blade. In order that rotary motion may be imparted to the shaft 29 and consequently to the gears 31 and 34, a pulley 35 is fixed upon the outer end of the shaft 29. At this point it will be understood that the gears 31 and 34 are reversely driven, inasmuch as the gear 34 is driven from the gear 31, and, as a consequence, the shafts 11 will be reversely driven, each shaft being rotated in an upward direction with respect to the teeth of the saw blade to be sharpened, and the abrading flanges 17 being therefore correspondingly rotated.

From the foregoing description of the invention it will be evident that, in the use of the machine, and in order to accurately sharpen the teeth of a saw, it is only necessary to assemble the clamping strips 27 with the opposite sides of the saw blade and arrange the saw blade and the strips within the kerfs 26 of the uprights 25 and then exert downward pressure on the assemblage so as to effect a clamping of the blade in place upon the standards with its toothed edge occupying a horizontal plane. Care is of course exercised, at this time, to have alternate teeth of the saw blade directly opposite the peripherally grooved abrading flanges of one of the shafts 11, and when this desired adjustment is obtained, the operator of the machine will be assured that the saw is properly positioned to be acted upon by the abrading flanges of the shaft 11 of the other abrading unit. Then, the shaft 29 being in motion and driven from a suitable source of power, either unit may be brought into active relation with respect to the saw blade to be sharpened and, after the alternate teeth of the saw blade have been suitably beveled and sharpened by the grooved abrasive peripheries of the flanges of this shaft, the shaft may be restored to its original or normal position and the other shaft adjusted so as to in like manner act upon the opposite faces of the other alternate teeth of the saw blade.

Having thus described the invention, what I claim is:

1. In a saw sharpening machine, means for supporting a saw blade, rotary tooth-abrading units supported at opposite sides of the blade supporting means and selectively movable into and out of active relation to a saw blade supported by said supporting means, each of said units embodying a rotary shaft and a series of spaced abrading elements arranged longitudinally of the shaft and having V-shaped peripheral grooves, the abrading elements of the two units being relatively staggered whereby the elements of one unit will be adapted to act upon one side of alternate teeth of the saw blade and the elements of the other unit will be adapted to act upon the opposite side of the other alternate teeth of the saw blade, and means for imparting rotary motion to each unit when in its active position.

2. In a saw sharpening machine, means for supporting a saw blade, pairs of pivoted arms arranged at opposite sides of the said supporting means and provided with bearings at their outer ends, an abrading unit supported by the arms of each pair and each unit comprising a shaft rotatably journaled in said bearings upon the arms, a series of spaced abrading elements upon each shaft extending circumferentially thereof and having V-shaped peripheral grooves the walls of which are roughened, the elements of the two units being arranged in relative staggered relation, handle members extending between the arms of the respective units and constituting means whereby the units may be swung into and out of active relation with respect to the toothed edge of a saw blade supported by the supporting means, and means for imparting rotary motion to each unit when in its active position.

3. In a saw sharpening machine, means for supporting a saw blade, pairs of pivoted arms arranged at opposite sides of the said supporting means and provided with bearings at their outer ends, an abrading unit supported by the arms of each pair and each unit comprising a shaft rotatably journaled in said bearings upon the arms, a series of spaced abrading elements upon each shaft extending circumferentially thereof and having V-shaped peripheral grooves the walls of which are roughened, the elements of the two units being arranged in relative staggered relation, handle members extending between the arms of the respective units and constituting means whereby the units may be swung into and out of active relation with respect to the toothed edge of a saw blade supported by the supporting means, and means for imparting rotary motion to each unit when in its active position, the said means comprising a drive shaft, a gear thereon, a gear driven from the last mentioned gear and a gear upon each of the abrading unit shafts for meshing engagement one with the drive gear and the other with the said gear driven therefrom in the active position of the respective units.

4. In a saw sharpening machine, a base, overhanging guide flanges upon the base arranged in spaced relation to each other, a saw supporting means comprising a base plate engaged at its ends beneath said flanges and extending above and resting upon the said base, a clamping screw carried by the base plate and adjustable to exert binding action against the upper surface of the said base, uprights upon the base plate having kerfs formed therein and decreasing in width in the direction of their lower ends, and blade engaging and clamping strips disposed at their ends in the kerfs for engagement against the opposite sides of a saw blade arranged between said strips whereby to support and clamp the blade frictionally in an upright position, and an abrading unit arranged at opposite sides of the blade supporting means and selectively movable into and out of active relation to the toothed edge of a saw blade supported by said means.

In testimony whereof I affix my signature.

HENRY MARSHALL.